Jan. 19, 1965     J. A. FARRELL     3,166,615
METHOD OF FORMING POROUS RIGID STRUCTURES
Filed Dec. 30, 1960     3 Sheets-Sheet 1

INVENTOR.
JAMES A. FARRELL
BY
*Burton & Parker*
ATTORNEYS

Jan. 19, 1965   J. A. FARRELL   3,166,615
METHOD OF FORMING POROUS RIGID STRUCTURES
Filed Dec. 30, 1960   3 Sheets-Sheet 2

INVENTOR.
JAMES A. FARRELL
BY
Burton & Parker
ATTORNEYS

Jan. 19, 1965     J. A. FARRELL     3,166,615

METHOD OF FORMING POROUS RIGID STRUCTURES

Filed Dec. 30, 1960     3 Sheets-Sheet 3

INVENTOR.
JAMES A. FARRELL
BY
Burton & Parker
ATTORNEYS

United States Patent Office 3,166,615
Patented Jan. 19, 1965

3,166,615
METHOD OF FORMING POROUS RIGID
STRUCTURES
James A. Farrell, 113 Pleasant Ave., Romeo, Mich.
Filed Dec. 30, 1960, Ser. No. 79,920
13 Claims. (Cl. 264—23)

This invention relates to methods of forming improved porous rigid structures.

This application is a continuation-in-part of my co-pending application S.N. 748,021, filed July 11, 1958, and now abandoned.

The porous structures made in accordance with the methods of the invention are useful as molds for vacuum forming of pulp and the like. Such molds prepared in accordance with the invention reproduce faithfully the contour and surface texture of the pattern and have the advantage of being prepared at low temperatures or room temperature, thereby avoiding the deleterious effects of distortion and shrinkage caused by a heating step in the manufacture thereof. The pores of the structures of the invention may additionally be filled with a bonding material, resinous or metallic, and the resulting filled structures possess great rigidity and hence are useful as patterns, jigs, dies and molds in many manufacturing operations.

Prior art porous structures for use as molds and the like have suffered from a number of disadvantages. Among these are the inability to faithfully reproduce the contour and surface texture of the pattern because of the use of particles relatively larger than the details of the surface to be reproduced. Prior art attempts to use finely divided particles yielded structures having insufficient porosity to be commercially acceptable as molds. The prior art method of sintering metallic particles together to make a porous structure suffers the disadvantage of requiring a pattern which will withstand the elevated sintering temperatures required, which patterns are very expensive. Additionally, the high temperatures necessary to obtain bonding by sintering or for ceramic bonding agents cause shrinkage and distortion of the porous mass and accordingly very involved and expensive procedures were required to compensate for shrinkage and distortion.

It is among the objects of this invention to provide methods for the forming of porous structures for use as molds and the like which are accomplished at low temperature, on the order of room temperature, thereby permitting the use of patterns made of such destructible materials as wood, plastics, hard wax, paper and the like. Additionally, the low temperature manufacture of the porous structures results in structures which do not shrink or distort.

A further object of the invention is to provide methods for forming porous structures which possess great strength and rigidity.

Further objects include the formation of such structures wherein the pores are filled with a further bonding material, such as resins, metals, etc. to provide even greater strength and rigidity for use in the manufacture of patterns, jigs, dies, etc.

Other objects and advantages of the invention will be apparent to those skilled in the art.

The method of the invention generally comprises the steps of uniformly coating the surfaces of finely divided individual solid particles with a fluid thermosetting resin dissolved in a volatile solvent, removing the solvent from the coated particles whereby said particles are uniformly coated with a thin fluid film of said resin leaving interstices between the particles, said film being of a thickness insufficient to fill the interstices between the particles when said coated particles are forced into direct contact with each other and the film displaced from the points of contact, compacting the coated particles into a mass of predetermined configuration before said resin has acquired its hardened state to force said particles into direct contact wtih each other and to displace the resin film from the points of contact into the interstices but without filling the interstices thereby forming a porous mass, maintaining said compacted porous mass in said configuration and subjecting the same to curing conditions for a period of time sufficient to cure said resin whereby said particles are bonded together thereby.

The finely divided particles making up the body of the mass may be metallic, quartz, glass, refractory materials such as alumina, or other solid finely divided material. It is preferable that the particles be of relatively uniform size. Average particle size diameters may range from 1 micron or less, where available, up to 0.03 inch or more, depending on the use of the structure.

The liquid thermosetting resin is preferably one which will cure to an initially hardened state at about room temperature. Final curing may be accomplished at temperatures of 100 to 400° F., preferable in stages. A variety of such resins are satisfactory including epoxy resins made from a bisphenol and epichlorhydrin together with a suitable hardener such as diamines, dibasic acids and the like, phenol formaldehyde resins, urea formaldehyde resins, and polyesters modified with styrene and the like plus a catalyst such as benzoyl peroxide or other organic peroxide.

The liquid resin is dissolved in a volatile solvent, such as methylene chloride, methyl ethyl ketone, etc., the resin solution being more dilute for finer particles. Thus for particles having a diameter of about 0.02 inch (30–40 mesh) about equal parts by weight of resin and solvent may be used whereas for particles of about 1–10 microns, about 4 parts by weight of solvent to 1 part by weight of resin is preferred.

A preferred method of coating the particles, particularly for smaller particles, involves subjecting the particles and resin solution to ultrasonic vibration. A typical procedure involves placing the solid particles in a cloth bag or the like, placing the bag in a vessel of resin solution and subjecting the vessel and contents to ultrasonic vibrations by means of an ultrasonic generator for a period of about 1 to 5 minutes. For larger particles, they may be coated by stirring in a vessel containing the resin solution.

After coating, the resin solution is permitted to drain off and the solvent removed by evaporation, preferably at room temperature until the particles are substantially dry to the touch. The coated particles are then placed in a mold or framed pattern coated with a suitable release agent and compacted with light manual pressure. The pattern and layer of coated particles are then placed in a flexible impervious bag attached to a suction hose and vacuum applied to further compact the particles, further manual pressure can be applied as necessary. The vacuum is shut off and the bag removed with care to avoid disturbing the particles.

The resin at this point is still uncured, and before compaction of the particles, exists as a thin fluid film. Upon compaction the particles are forced into direct contact with each other, forcing the film away from the points of immediate contact but bridging the spaces adjacent the points of contact. The film must be so thin so that the displaced resin does not fill the interstices between the particles. It is apparent that for very fine particles the resin film before the compaction must be very thin to avoid displacement of sufficient resin to fill the interstices.

The operation of the compaction step is schematically illustrated in the attached drawings, as is one embodiment of the invention.

Figure 1:
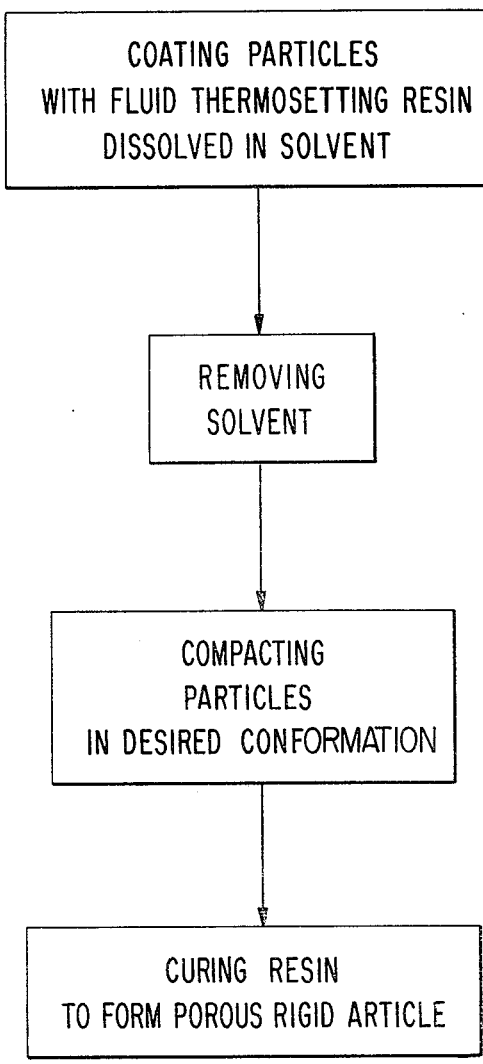
FIG. 1 illustrates the sequence of steps involved in the method of the invention.
Figure 2:
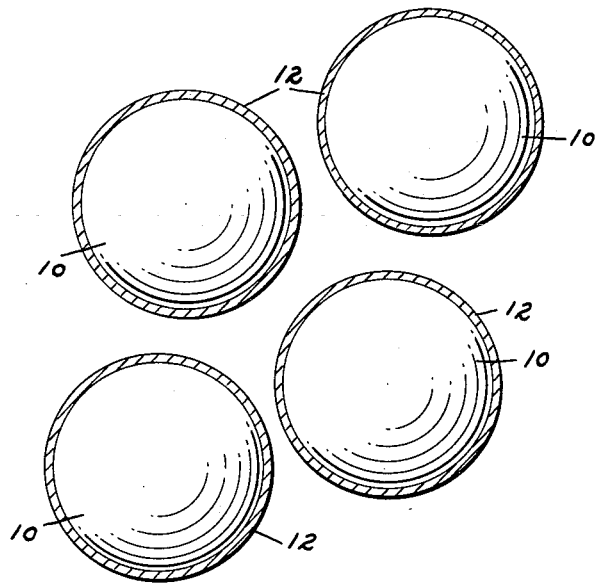
FIG. 2 illustrates schematically a plurality of coated particles before they are compacted.
Figure 3:
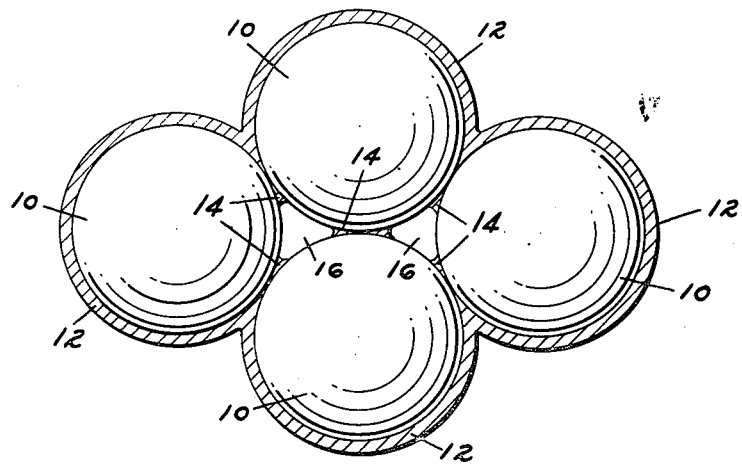
FIG. 3 illustrates schematically the particles after they have been compacted.

In FIG. 2, the particles 10 are shown coated with a thin film 12 of liquid resin. The particles are shown as spherical, although in actual practice most particulate materials will not be in spherical form. After compaction, as shown in FIG. 3, the particles are in direct contact with each other at points 14 with no resin film between the particles. The film 12 is forced away from the point of contact 14, bridging at the points of contact as shown to bond the particles together but not filling the interstices 16. It has been found that the thickness of film 12 should be less than about 2½ percent of the diameter of the particles 10 to avoid filling the interstices 16.

After the compacted particles and pattern are removed from the suction bag the resin is permitted to cure to an initially hardened state while the particles are in contact with the pattern. In the case of epoxy resins, this will occur in 8–16 hours at room temperature or about 4 hours at 100° F.

After the preliminary cure the bonded particles are removed from the pattern and the porous mass subjected to final curing, preferably in stages. Thus, with epoxy resins the following cycle has been found satisfactory: 1 hour at 150° F., 1 hour at 175° F., 1 hour at 200° F., and 2 hours at 250° F. In applications where the structure is to encounter temperatures higher than 250° F., a further cure of 1 hour at 350° F. may be used. The rigid porous structure is now ready for use.

When the structure is to be used as a vacuum mold, it is preferable that a backing layer or stratum of particles coarser than the surface particles be employed. Thus, after the coated surface particles are compacted against the pattern, a layer of larger coated particles is compacted thereon and the entire mass later subjected to curing.

The pores of the resulting structure may be filled, for example with an additional bonding material, such as a thermosetting resin or the like. This is accomplished by drawing the resin or other bonding material in by suction and subsequently curing. For example, porous articles made of aluminum, steel or copper powder may be filled with additional thermosetting resin in the manner described and the cured filled structure may be machined, drilled or tapped by conventional methods to yield articles useful in tooling, as jigs, dies, gauges and the like.

Additionally, metallic material may be used to fill the pores. Thus, porous structures made of finely divided steel or stainless steel in accordance with the above procedure may be placed in a chemical nickel plating bath of the types shown in U.S. Patents 2,532,283, 2,658,841 and 2,658,842 or an atmosphere of nickel carbonyl to fill the pores with nickel. It appears therefore that the porous structure contains many areas uncoated by the resin or the resin contains pinholes whereby the metal may be plated.

Porous metallic structures made in accordance with the above procedure from finely divided metals have high thermal and electrical conductivity, approaching that of solid metal. Articles made therefrom are therefore very useful as molds, etc. where thermal conductivity is important, as in vacuum forming with heat curing, injection molds, and the like.

Figure 4:
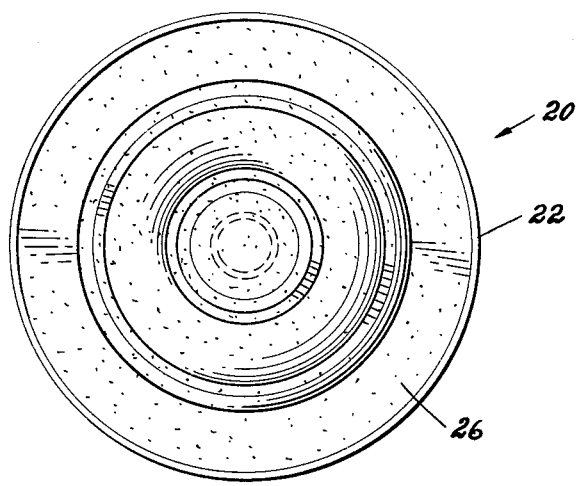
FIG. 4 is a plan of a mold embodying the invention herein described.
Figure 5:
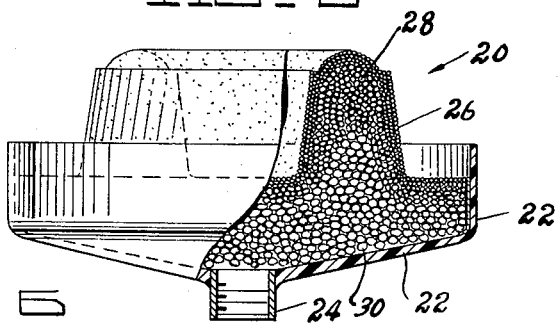
FIG. 5 is a vertical sectional view through the mold shown in FIG. 4.
Figure 6:
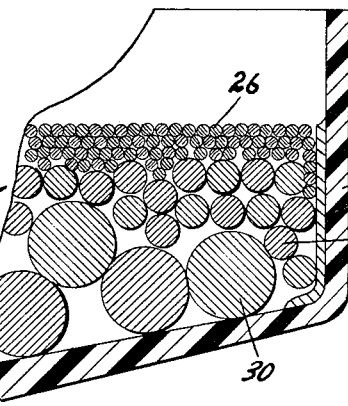
FIG. 6 is an enlarged vertical sectional view of the mold shown in FIG. 5.

A mold made according to the invention may be formed in any shape and size desired. Such a one is illustrated in FIGS. 4 through 6. The body of the mold is formed of a multitudinous number of structural particles adhesively secured together into a mass which is porous throughout. One face of the mold is that upon which the object to be molded is formed. The opposite face of the mold is provided with an enclosure connected with a vacuum line so that suction can be applied to such opposite face to create a suction throughout the mold and upon the mold face to draw paper pulp, plastic, or the like thereagainst to be molded thereupon. In the drawing the mass of the mold which is formed of the small structural particles is indicated generally by the numeral 20 and the enclosure or shroud which extends over the rear face of the mold is indicated as 22. A vacuum line 24 is secured to and held by this enclosure. The enclosure might be formed of any suitable material such as metal or fiberglass carrying a suitable plastic binder. The line 24 extends to a suitable source of vacuum.

The contour of the mold face itself may be any desirable shape and the surface design may be arranged to represent any desired surface texture, graining, or the like. The small particles or pellets which make up the mass of the mold may be of any suitable material as, for example, volcanic ash, sand, gravel, glass, granulated metal such as aluminum, bronze, or steel, crushed walnut shells, plastic particles or micro balloons or the like. For very fine particles emery grit, such as is used in making sandpaper, may be employed.

The mold may be formed throughout of particles of generally the same size or it may be formed in a series of strata wherein each stratum is made up of particles of a different size. In order to ensure suitable porosity, it is desirable that the particles which go to make up any stratum or the entire mold structure where the entire structure is formed of similar particles, be of substantially uniform size. If a mixture of particles of all sizes is employed, there is a tendency for the small particles to fill up the interstices between the larger particles and thus build up a dense structure which will not exhibit the desired porosity for a porous mold unless the amount of fine sizes is carefully controlled.

While the entire mold structure may be formed of similar particles, a preferred construction is to provide a plurality of differently sized particle strata. The mold face stratum would preferably be formed of fine particles which would permit accurate reproduction of surface texture and would ensure that the suction applied to the mold face from the interior of the mold was applied through a multitudinous number of very fine orifices. Such would ensure that the material being drawn up against the face of the mold would be drawn thereagainst throughout its entire area and the fine character of the porosities would inhibit drawing the material into the interior of the mold. The next adjacent stratum might be formed of particles of a larger size. The interstices through the particles in this next adjacent stratum would be larger than the passageways through the particles in the mold face stratum but would communicate therewith. The entire mold structure might be made up of such a number of strata as was desired. In FIGS. 5 and 6, three different strata are shown, indicated in FIG. 6 as 26 for the mold face stratum, 28 for the second stratum, and 30 for the innermost stratum. In FIG. 6 the particles are substantially enlarged in size. The primary object of using a plurality of strata is that the cost is reduced and adequate porosity is attained, thereby providing a high suction upon the mold face and the suction is brought to bear upon the mold face substantially throughout.

The particles employed in the mold face stratum might well be less than .005", as for example .003" or .001". Particles of micron size for the very fine might well be employed. As stated, it is preferable that they be of a generally uniform size and preferably of a shape which will ensure a large number of air passageways therethrough. If the particles used in the mold face stratum were of less diameter than .025", the particles used in the next adjacent stratum might be of less diameter than .125", and the bulk of the large particles might be of less diameter than ¼" or even up to 1".

The following examples further illustrate preferred embodiments of the invention. All parts are by weight.

*Example I*

The following solution was prepared:

| | Parts |
|---|---|
| Epoxy resin (2,2 bis (4-hydroxyphenyl) propane-epichlorhydrin condensation product) | 100 |
| Hardener (1,8-diamino-p-methane) | 22 |
| Methylene chloride | 400 |

The above solution was placed in a vessel and 2000 parts of finely divided steel particles (average 10 microns) wrapped in a cloth bag were placed in the solution. The vessel was then subjected to 40 kilocycles in a commercial ultrasonic generator (80 watts, 1 gallon capacity) for three minutes. The bag of particles was removed, the excess solution permitted to drain off, the bag opened and the particles spread on absorbent paper to permit evaporation of the solvent. After the particles were dry to the touch, about 30 minutes, the particles were placed on the surface of a framed plaster pattern which had been coated with liquid wax and a thin polyvinyl alcohol film as a parting agent. The particles were manually compacted in the frame to fill the same. The entire assembly was placed in a plastic bag provided with a suction hose, vacuum applied and manual pressure continued until the mass was firm to the touch. The vacuum was shut off, the filled framed pattern removed from the plastic bag, and the assembly was allowed to remain for 12 hours at 75° F.

After the preliminary cure, the porous assembly was removed from the pattern and subjected to a final cure in an oven as follows:

150° F. for one hour
175° F. for one hour
250° F. for two hours

The resulting assembly faithfully reproduced the pattern configuration and texture and provided an excellent vacuum mold.

*Example II*

The procedure of Example I was followed to form a porous cylinder 1½ inches in diameter by 3 inches long. The porous cylinder was sensitized by a three minute dip in a bath containing:

400 cc. hydroquinone
100 cc. pyrocatechol
1000 cc. acetone and activated in a two minute bath of 10 g. stannous chloride
40 cc. hydrochloric acid
1000 cc. distilled water The porous cylinder was then placed in a chemical nickel plating bath having the following composition:

| | Moles per liter |
|---|---|
| Nickel sulfate | 0.08 |
| Sodium hypophosphite | 0.23 |
| Lactic acid | 0.30 |
| Propionic acid | 0.003 |

After 16 hours the pores were completely filled with metallic nickel and the exterior surface was coated with nickel. The resulting structure was readily drilled, tapped and machined.

*Example III*

The procedure of Example I was followed to form a porous cylinder which was placed in a tube through which nickel carbonyl was passed for 168 hours. The resulting structure was completely filled with nickel.

*Example IV*

The procedure of Example I was followed to produce a porous mold formed of glass particles having an average diameter of about 50 microns. The resulting mold possessed excellent porosity and faithfully reproduced the pattern.

The mold was then sensitized and activated as in Example II and chemically plated with nickel for 20 minutes at 190° F. in the following bath:

7 oz. nickel chloride
1½ oz. sodium hypophosphite
1½ oz. sodium citrate
1 gal. water The glass mold was thereby plated with nickel insufficient to fill the pores.

The porous structures of this invention can thus be plated with metals including nickel, copper and silver, and it is apparent that the plating can either fill the pores or only partially fill the pores. It is also apparent that either metallic or non-metallic porous structures may be chemically plated in the manner described.

*Item V*

The procedure of Example I was followed, using 1000 parts of fine aluminum powder (25 microns). The resulting mold was found to be excellent for vacuum forming. To illustrate the filling of the pores, a vacuum was applied to the back side of the mold and 100 parts of the resin containing 22 parts of the hardener of Example I were drawn into the mold. The structure was allowed to cure overnight at room temperature and thereafter cured at elevated temperature as set forth in Example I. The resulting structure had great strength and was readily machined, drilled and tapped.

As pointed out above, it is preferred, when forming vacuum molds according to the invention to employ a backing layer of coated particles of greater diameter. Such particles may be of particles of about ⅛ inch in diameter. The surface layer must be of much finer particles, however, to faithfully reproduce the configuration and texture of the pattern. The surface layer may be relatively thin, on the order of ⅛ to ¼ inch.

The strength and dimensional stability of the structures of the invention is due to the fact that all the particles are in direct contact with no binder film therebetween. The structure is therefore as compact as possible without distortion of the individual particle shapes. The use of a very thin film of fluid and hence displaceable resin permits the direct contact of the particles while permitting bonding thereof without filling the interstices.

While the invention has been described in terms of certain examples, they are to be considered illustrative rather than limiting. Thus, those skilled in the art will recognize that many fluid thermosetting resins and many types of particles may be employed in accordance with the teachings of the invention.

I claim:
1. The method of forming a porous rigid structure comprising the steps of uniformly coating the surfaces of finely divided individual solid particles with a fluid thermosetting resin dissolved in a volatile solvent, removing the solvent from the coated particles whereby said particles are uniformly coated with a thin fluid film of said resin leaving interstices between the particles, said film being of a thickness insufficient to fill the interstices between the particles when said coated particles are forced into direct contact with each other and the film displaced from the points of contact, compacting the coated particles into a mass of predetermined configuration before said resin has acquired its hardened state to force said particles into direct contact with each other and to displace the resin film from the points of contact into the interstices but without filling the interstices thereby forming a porous mass, maintaining said compacted porous mass in said configuration and subject the same to curing conditions for a period of time sufficient to cure said resin whereby said particles are bonded together thereby.

2. The method set forth in claim 1 wherein said particles are coated with said thermosetting resin by subjecting said particles and the resin dissolved in the volatile solvent to ultrasonic vibrations.

3. The method set forth in claim 1 wherein said thermosetting resin comprises a bisphenol-epichlorohydrin condensation product and a hardener therefor.

4. The method set forth in claim 3 wherein said resin is dissolved in a solvent comprising methylene chloride.

5. The method of forming a porous rigid structure comprising the steps of uniformly coating the surfaces of finely divided individual solid particles with a fluid thermosetting resin dissolved in a volatile solvent and having the property of preliminary curing to an initially hardened state at room temperature, removing the solvent from the coated particles whereby said particles are uniformly coated with a thin fluid film of said resin leaving interstices between the particles, said film being of a thickness insufficient to fill the interstices between the particles when said coated particles are forced into direct contact with each other and the film displaced from the points of contact, compacting the coated particles into a mass of predetermined configuration before said resin has acquired its hardened state to force said particles into direct contact with each other and to displace the resin film from the points of contact into the interstices but without filling the interstices thereby forming a porous mass, maintaining said compacted porous mass in said configuration and subjecting it to room temperature for a period of time sufficient to preliminarily cure said resin whereby said particles are bonded together thereby and subjecting said mass to final curing conditions whereby said resin is hardened to its final state.

6. The method of forming a porous rigid mold structure of substantial strength and high heat conductivity comprising the steps of uniformly coating the surfaces of finely divided individual structurally strong heat conductive metal particles with a fluid thermosetting resin dissolved in a volatile solvent, removing the solvent from the coated particles whereby said particles are uniformly coated with a thin fluid film of said resin leaving interstices between the particles, said film being of a thickness insufficient to fill the interstices between the particles when said coated particles are forced into direct contact with each other and the film displaced from the points of contact, compacting the coated particles into a mass of predetermined configuration before said resin has acquired its hardened state to force said particles into direct contact with each other and to displace the resin film from the points of contact between the particles into the interstices but without filling the interstices thereby forming a porous mass, maintaining said compacted porous mass in said configuration and subjecting it to curing conditions for a period of time sufficient to cure said resin whereby said particles are bonded together thereby.

7. The method of forming a rigid structure of substantial strength consisting of solid particles held together by a binder which comprises: first forming a rigid porous structure by the steps of uniformly coating the surfaces of finely divided individual solid particles with a fluid thermosetting resin dissolved in a volatile solvent, removing the solvent from the coated particles whereby said particles are uniformly coated with a thin fluid film of said resin leaving interstices between the particles, said film being of a thickness insufficient to fill the interstices between the particles when said coated particles are forced into direct contact with each other and the film displaced from the points of contact, compacting the coated particles into a mass of predetermined configuration, before said resin has acquired its hardened state to force said particles into direct contact with each other and to displace the resin film from the points of contact into the interstices but without filling the interstices thereby forming a porous mass, maintaining said compacted porous mass in said configuration and subjecting it to curing conditions for a period of time sufficient to cure said resin whereby said particles are bonded together thereby, and thereafter filling the pores of said rigid porous structure by flowing thereinto in the fluid state a bonding material having the capability of setting to the solid state without disturbing individual particles and causing said bonding material to set to the solid state therein.

8. The method of forming a rigid structure of solid particles held together by a binder as defined in claim 7, wherein the pores of the rigid porous structure first formed are filled with a bonding material comprising a bonding fluid thermosetting resin and such resin is cured to its hardened state therein.

9. The method of forming a rigid structure of solid particles held together by a binder as defined in claim 7 wherein the particles of said rigid porous structure first formed comprise metal particles and said structure is exposed to a metal compound decomposable to a metal whereby the pores of said rigid porous structure are filled with a bonding material comprising a bonding metal forming a rigid solid structure.

10. The method of forming a rigid solid structure of solid particles held together by a binder as defined in claim 9, wherein said particles are ferrous particles and said mass is maintained in an aqueous bath of nickel plating agent to fill the pores thereof with nickel.

11. The method of forming a rigid structure of solid particles held together by a binder as defined in claim 9 wherein said particles are ferrous particles and said mass is maintained in an atmosphere of nickel carbonyl to fill the pores thereof with nickel.

12. The method of forming a rigid structure of substantial strength consisting of solid particles held together by a binder which comprises first forming a rigid porous structure by the steps of uniformly coating the surfaces of finely divided individual solid particles with a fluid thermosetting resin dissolved in a volatile solvent and having the property of preliminary curing to an initially hardened state at room temperature, removing the solvent from the coated particles whereby said particles are uniformly coated with a thin fluid film of said resin leaving interstices between the particles with said film being of a thickness insufficient to fill the interstices between the particles when said coated particles are forced into direct contact with each other and the film displaced from the points of contact, compacting the coated particles into a mass of predetermined configuration following partial curing of the resin but before said resin has set to such a hardened state as to prevent displacement of the resin film from between points of contact of the particles forcing said particles into direct contact with each other to displace the resin film from between the points of contact into the interstices but without filling the interstices thereby forming a porous mass, maintaining said porous mass compacted in said configuration and subjecting it to room temperature for a period of time sufficient to preliminarily cure said resin whereby said particles are bonded together thereby, subjecting said mass to final curing conditions whereby said resin is hardened to its final state, and thereafter filling the pores of said rigid porous structure by flowing thereinto in the fluid state a bonding material having the capability of setting to the solid state without disturbing said particles and causing said material to set to the solid state therein.

13. The method of forming a porous rigid structure comprising the steps of uniformly coating the surfaces of finely divided individual solid particles having an average particle size in the range of 1 micron to 0.03 inch in diameter with a fluid thermosetting resin dissolved in a volatile solvent, controlling the concentration of resin in the solvent to yield, upon removal of the solvent, a resin coating on said particles having a thickness permitting displacement upon compacting the particles into direct contact and which is insufficient to fill the interstices between the particles upon such displacement, removing the solvent from the coated particles, compacting the coated particles into a mass of predetermined configuration before said resin has acquired its hardened state to force said particles into direct contact with each other and to displace the resin film from the points of contact into the interstices but without filling the interstices thereby forming a porous mass, maintaining said compacted porous mass in said configuration and subjecting the same to curing conditions for a period of time sufficient to cure said resin whereby said particles are bonded together thereby.

References Cited in the file of this patent

UNITED STATES PATENTS

| | | |
|---|---|---|
| 1,117,601 | Porter | Nov. 17, 1914 |
| 1,992,718 | Records | Feb. 26, 1935 |
| 2,079,667 | Swift | May 11, 1937 |
| 2,114,229 | Martin et al. | Apr. 12, 1938 |
| 2,150,121 | Kistler | Mar. 7, 1939 |
| 2,164,476 | Scutt | July 4, 1939 |
| 2,253,697 | Genesy | Aug. 26, 1941 |
| 2,273,589 | Olt | Feb. 17, 1942 |
| 2,297,248 | Rudolph | Sept. 29, 1942 |
| 2,363,213 | Wallace | Nov. 21, 1944 |
| 2,504,208 | Locke et al. | Apr. 18, 1950 |
| 2,732,078 | Records | Jan. 24, 1956 |
| 2,806,254 | Craig | Sept. 17, 1957 |
| 2,806,509 | Bozzacco et al. | Sept. 17, 1957 |
| 2,810,932 | O'Conor Honey et al. | Oct. 29, 1957 |
| 2,812,549 | Wall | Nov. 12, 1957 |
| 2,829,982 | Hoyt | Apr. 8, 1958 |
| 2,834,052 | Hunn | May 13, 1958 |
| 2,846,759 | Foley et al. | Aug. 12, 1958 |
| 2,918,392 | Beller | Dec. 22, 1959 |
| 2,970,933 | Barera et al. | Feb. 7, 1961 |
| 2,981,330 | Stickney et al. | Apr. 25, 1961 |
| 3,001,582 | Kindseth et al. | Sept. 26, 1961 |
| 3,083,411 | Glass | Apr. 2, 1963 |

FOREIGN PATENTS

| | | |
|---|---|---|
| 597,886 | Canada | May 10, 1960 |
| 308,315 | Great Britain | July 21, 1930 |
| 244,901 | Sweden | Nov. 4, 1943 |

UNITED STATES PATENT OFFICE
CERTIFICATE OF CORRECTION

Patent No. 3,166,615  January 19, 1965

James A. Farrell

It is hereby certified that error appears in the above numbered patent requiring correction and that the said Letters Patent should read as corrected below.

Column 1, line 29, for "are" read -- is --; column 7, line 19, for "subject" read -- subjecting --.

Signed and sealed this 29th day of June 1965.

(SEAL)
Attest:

ERNEST W. SWIDER
Attesting Officer

EDWARD J. BRENNER
Commissioner of Patents